United States Patent [19]

Johnson

[11] Patent Number: 4,997,332

[45] Date of Patent: Mar. 5, 1991

[54] MODULAR SAILBOAT TRAILER

[75] Inventor: Lawrence N. Johnson, Spokane, Wash.

[73] Assignee: EZ Loader Boat Trailers, Inc., Spokane, Wash.

[21] Appl. No.: 858,699

[22] Filed: May 2, 1986

Related U.S. Application Data

[60] Division of Ser. No. 452,793, Dec. 23, 1982, Pat. No. 4,592,694, which is a continuation of Ser. No. 936,521, Aug. 24, 1978, abandoned.

[51] Int. Cl.$^5$ .............................................. B60P 3/10
[52] U.S. Cl. .................................. 414/534; 280/414.1; 403/121; 403/385
[58] Field of Search ............... 414/532, 533, 534, 529, 414/482, 535; 280/414.1; 403/121, 385, 386, 389, 400

[56] References Cited

U.S. PATENT DOCUMENTS

| | | | |
|---|---|---|---|
| 2,889,946 | 6/1959 | Holsclaw | 414/534 |
| 3,403,798 | 10/1968 | Flachbarth et al. | 414/535 X |
| 3,917,087 | 11/1975 | Godbersen | 414/534 |
| 3,974,924 | 8/1976 | Ullman, Jr. | 414/531 |
| 4,094,527 | 6/1978 | Miller | 414/534 |
| 4,464,092 | 8/1984 | Chambers et al. | 414/534 |
| 4,592,694 | 6/1986 | Johnson | 414/534 |

Primary Examiner—David A. Bucci
Attorney, Agent, or Firm—Wall and Roehrig

[57] ABSTRACT

A boat trailer which is characterized by laterally spaced longitudinally extending booms or side frame members and cross members which are supported from the side frame members at their ends on axially aligned pivots. The cross members laterally space the booms and have provision for selectively mounting thereon either pairs of transversely spaced longitudinally extending bars which carry assemblies of boat hull engaging members mounted thereon so as to pivot on longitudinally extending axes, or vertically extendable posts with the longitudinal bars and associated boat hull engaging members mounted thereon in elevated relation above the side frame members. The boat trailer eliminates the necessity of rigid cross frame members structurally interconnecting the side frame members, or booms, and enables the trailer structure to be readily adapted to carry either shallow draft, shoal draft, or deep keel boats having various hull configurations.

6 Claims, 8 Drawing Sheets

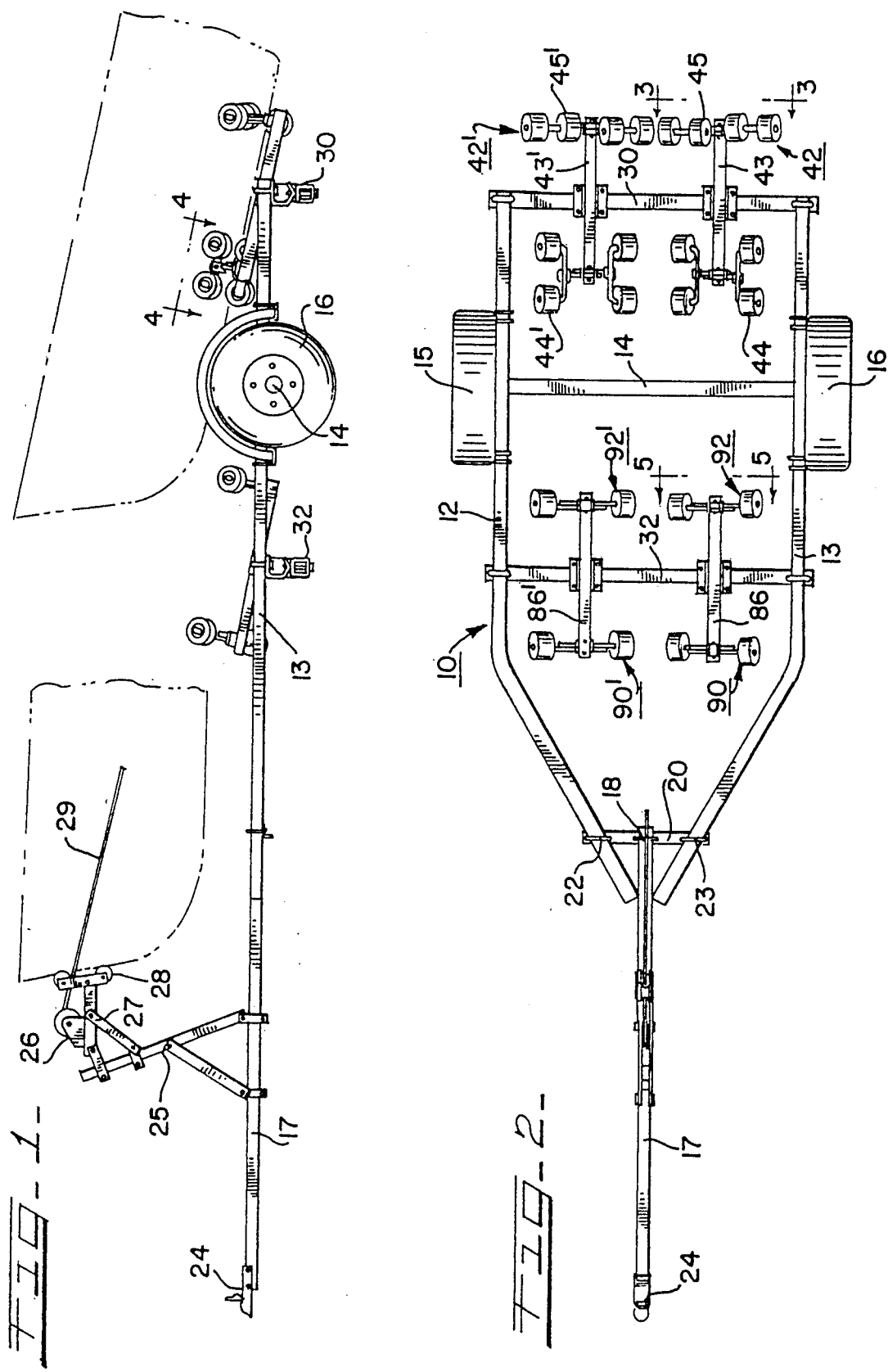

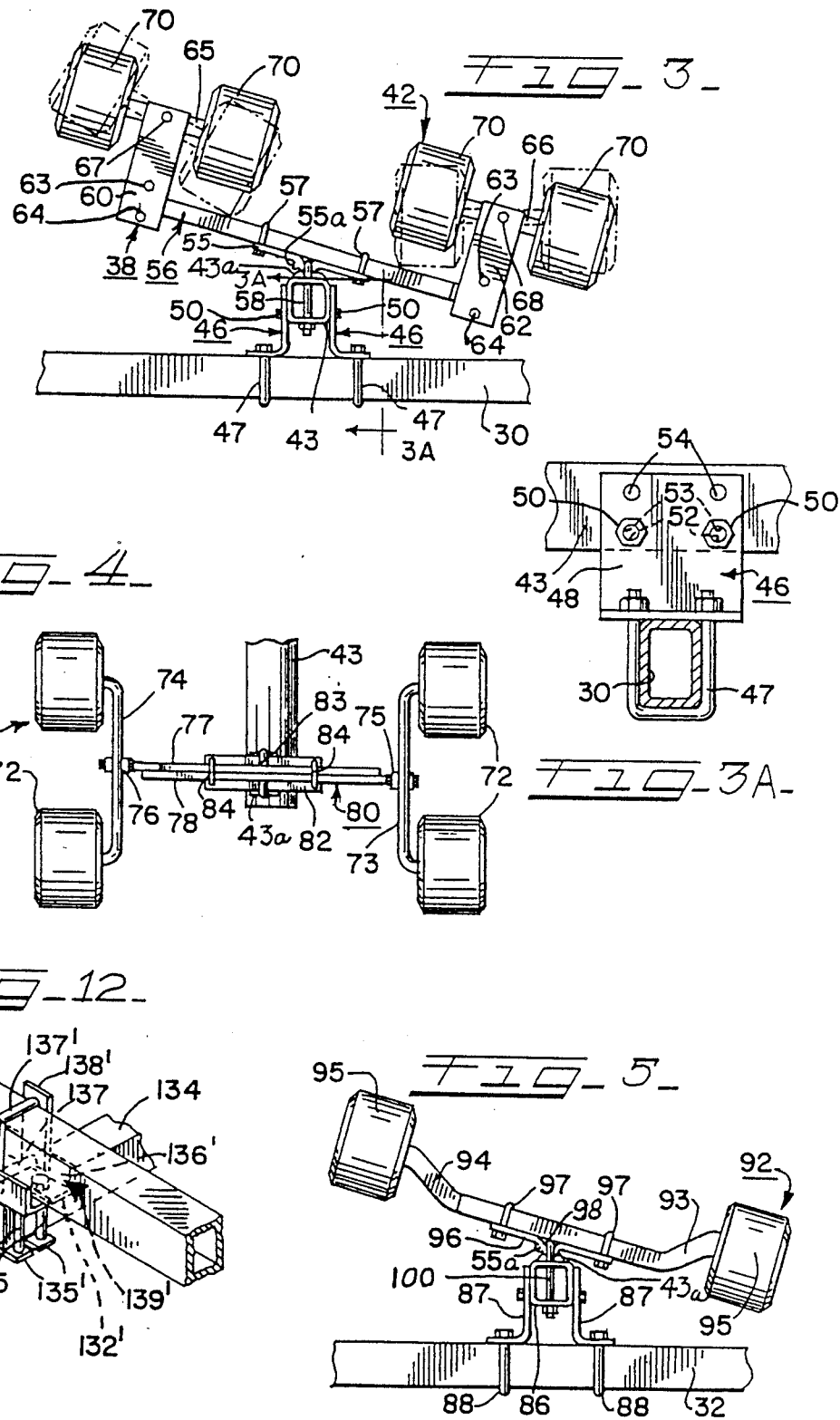

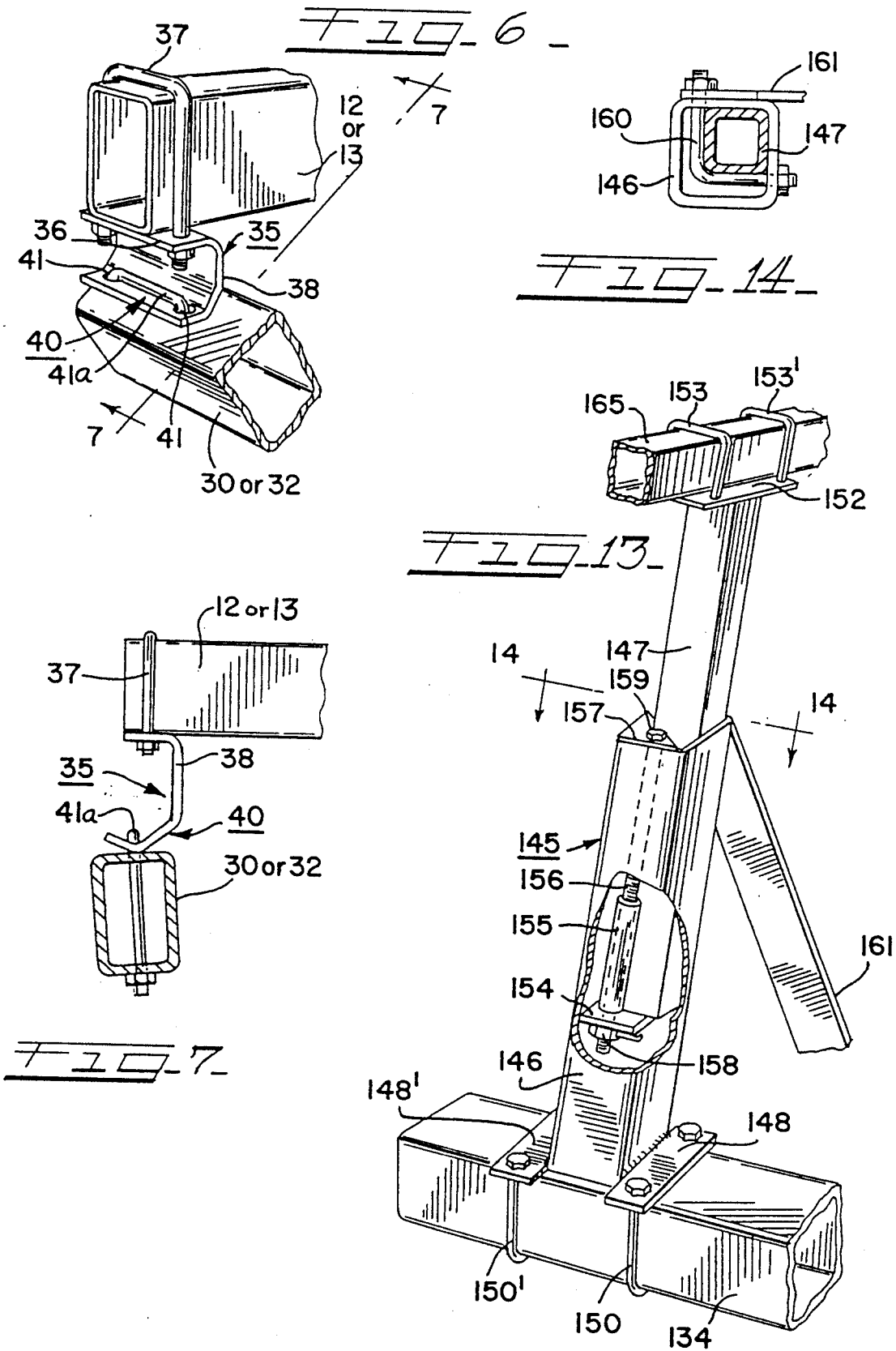

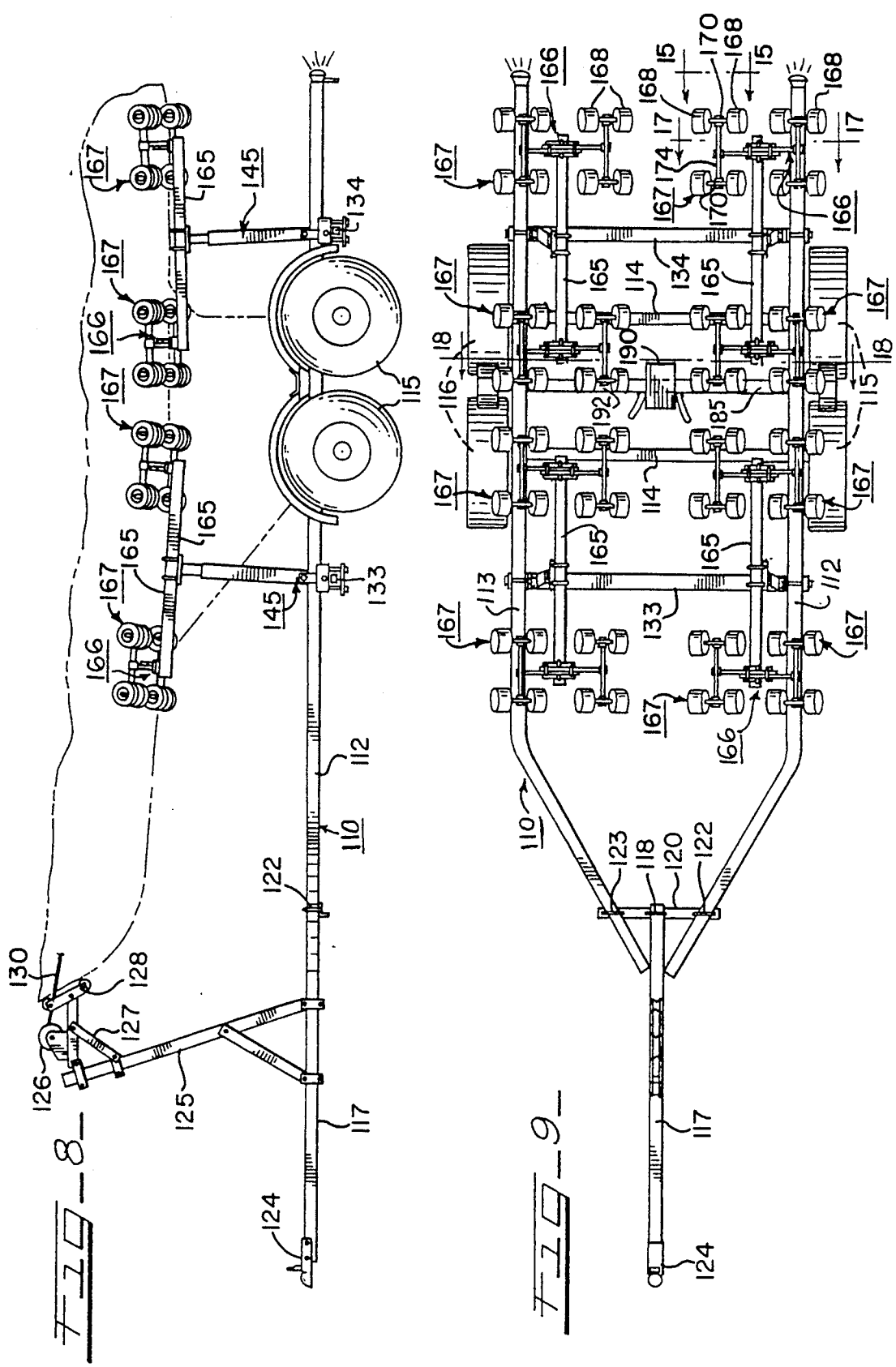

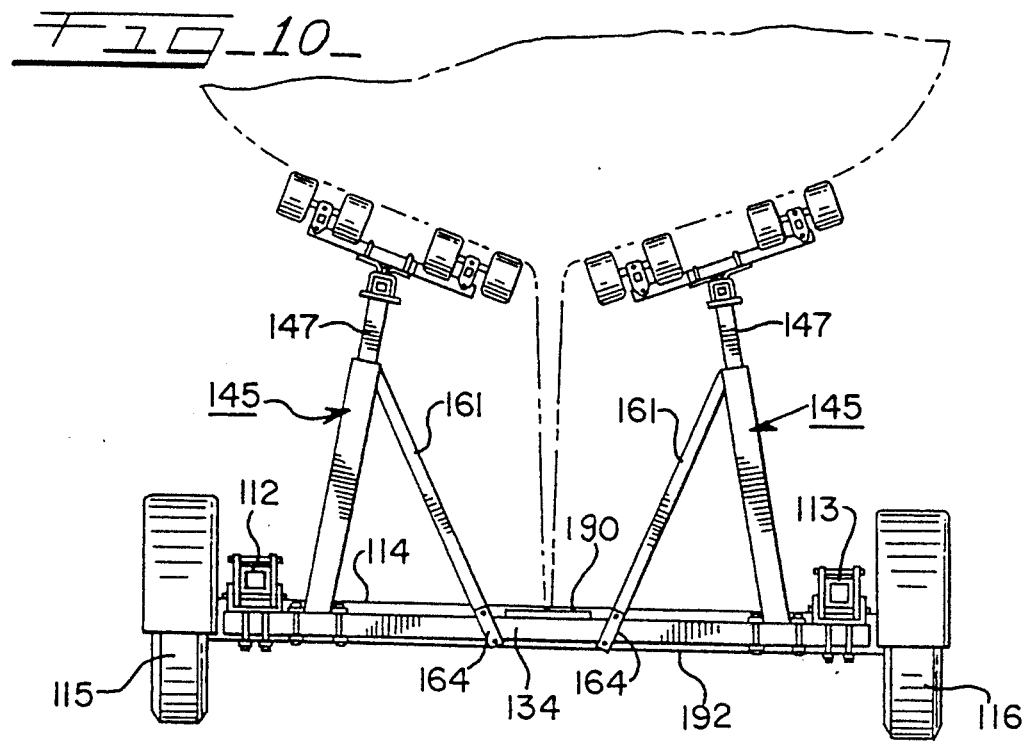
FIG_10_
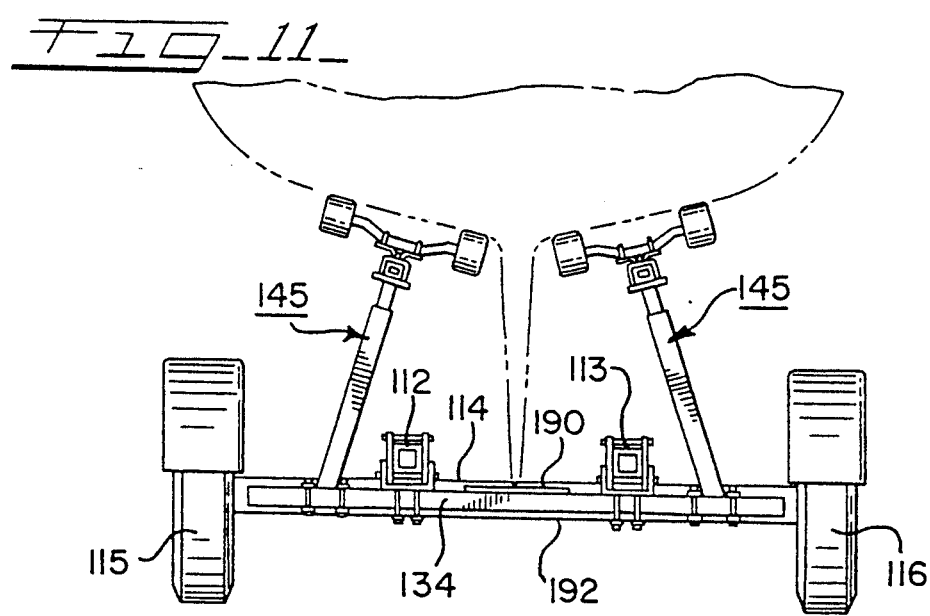
FIG_11_

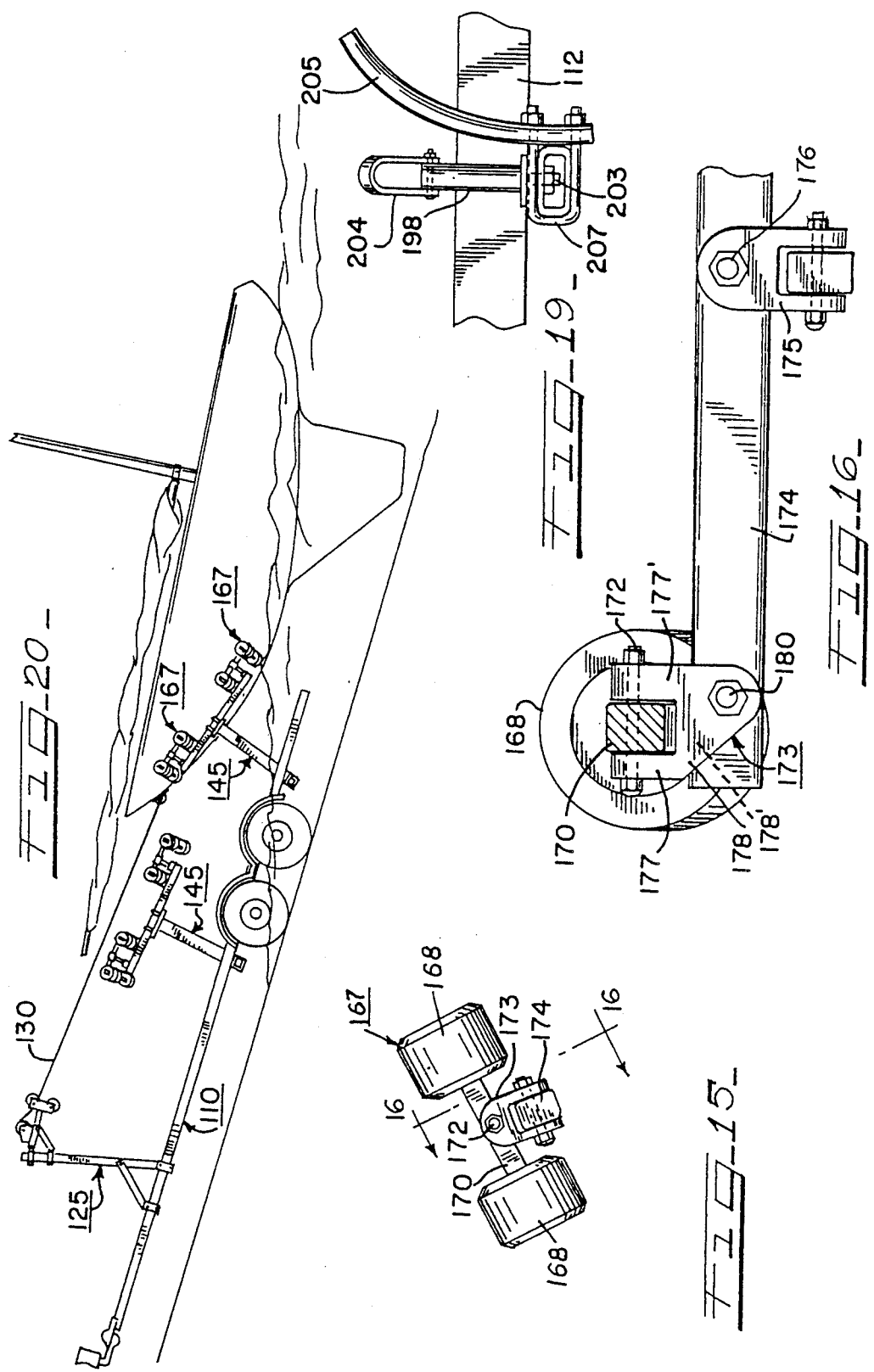

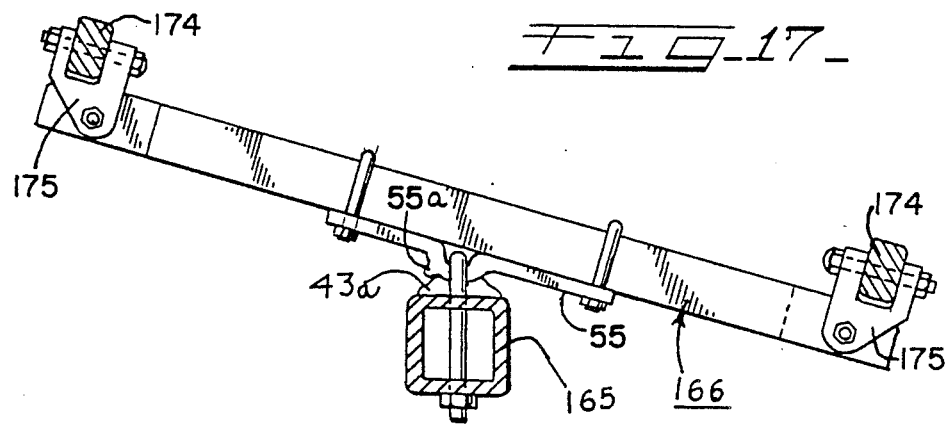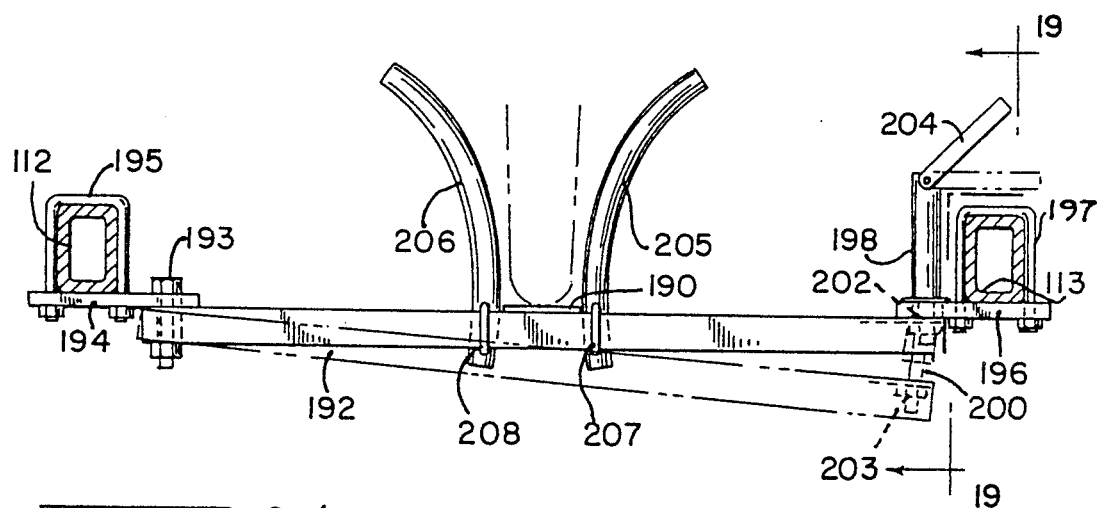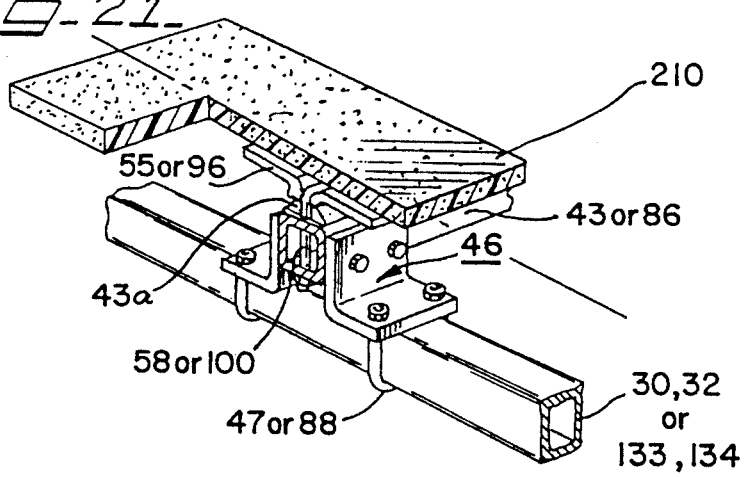

MODULAR SAILBOAT TRAILER

This is a divisional application of copending continuation application Ser. No. 452,793, filed on Dec. 23, 1982 (now U.S. Pat. No. 4,592,694, issued June 3, 1986) which is a continuation of prior application Ser. No. 936,521, filed Aug. 24, 1978, now abandoned.

BACKGROUND OF THE INVENTION

This invention relates in general to boat trailers and, in particular, to an improved modular boat trailer which is especially designed for hauling and storing a variety of boats of the type generally referred to as pleasure boats.

More specifically, but without restriction to the particular use which is shown and described, this invention relates to a boat trailer structure which eliminates the need for structural frame-forming cross members rigidly interconnecting and laterally spacing the longitudinally extending trailer side boom members, while permitting the quick and convenient launching an retrieving of boats.

The popularity of sail and power boating, and other water activities involving the use of boats which are removed from the water when not in use and transported to and from storage areas remote from the waterway, has resulted in the development of boat transporting trailers of various designs. Generally recognized requirements for a satisfactory boat trailer are that the trail securely cradle and support the boat, and that the boat supporting elements of the trailer conform to the boat hull contour so that pressures exerted thereby are distributed and localized stress, which could result in damage to the hull, will be avoided. While some boat trailers, such as the self-adjusting all roller construction, meet these requirements, others fail to meet even these most basic parameters.

It is desirable that the trailer structure provide arrangements which facilitate launching of these various types of pleasure boats from the trailer, and retrieving the boat when removing it from the water. However, boat trailers have heretofore lacked flexibility with respect to being able to accommodate different boat hull types, requiring a boat trailer manufacturer to provide a number of totally different types of hull structures. Trailers have heretofore generally been designed to support only one type of hull structure with a limited accommodation of different configurations or sizes. With the proliferation of hull designs for the several types of pleasure boats which require a transporting vehicle, trailer manufacturers have been required to provide numerous models, each adapted to accommodate a particular type of boat hull within a limited size range. Some of these trailer designs provide launching capabilities to varying degrees, but other designs, such as frequently used for sailboats with permanent deep keels, require power equipment to lift the boat into or from the trailer for launching into the water.

SUMMARY OF THE INVENTION

It is, therefore, an object of the present invention to improve boat trailers.

It is another object of this invention to improve boat trailers wherein a hull supporting structure will include adjustable elements which permit converting the same basic trailer frame configuration to accommodate a variety of boat hull types, such as power boats and other shallow draft vessels having various hull configurations or sailboats having shoal draft or deep keels.

Another object of the invention is to utilize a basic trailer frame structure and vary the associated boat hull supporting elements to accommodate a shallow draft vessel or a deep draft vessel.

Still another object of this invention is to enable a basic boat trailer frame module to load, haul, and launch a variety of boats having different hull types of varying configurations by arranging modular hull engaging members so as to load and launch either shallow or deep draft vessels directly from the trailer and into the water at a ramp area without the need for any additional equipment.

These and other objects are attained in accordance with the present invention wherein there is provided a boat trailer having a frame structure which is adapted to support and transport boats of trailerable size, which frame structure comprises axially extending cross bar members pivotally supported from and spacing longitudinally extending side booms and carrying associated hull engaging members adapted to engage, in supporting relation, the hull of a boat. The boat trailer is so constructed that the hull engaging members may be mounted in various relationships to enable the trailer to be adapted for receiving boats of either shallow or deep draft type and having a variety of hull configurations.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a side elevation of a boat trailer which embodies the invention with the trailer being shown with a shallow draft type boat being indicated in phantom line in two positions, one at the start of loading and the other at a fully loaded position;

FIG. 2 is a plan view of the trailer structure shown in FIG. 1;

FIG. 3 is an elevational view, to an enlarged scale, showing a paired hull engaging roller arrangement at the trailing end of the trailer, the view being taken on the line 3—3 of FIG. 2;

FIG. 3A is a fragmentary elevational view taken on line 3A—3A of FIG. 3;

FIG. 4 is a plan view, to an enlarged scale, showing the paired double roller arrangement at the trailing end of the trailer, the view being taken on the line 4—4 of FIG. 1;

FIG. 5 is an elevational view, to an enlarged scale, showing the hull engaging roller arrangement at the forward or leading end of the trailer, the view being taken on the line 5—5 of FIG. 2;

FIG. 6 is a fragmentary perspective view showing the pivot connection between the cross members and the longitudinally extending frame side booms of the trailer shown in FIGS. 1 and 2;

FIG. 7 is a fragmentary sectional view on a slightly reduced scale taken on the line 7—7 of FIG. 6;

FIG. 8 is a side elevational view of the boat trailer structure with hull engaging roller supporting assemblies which are arranged for loading and carrying a deep draft type sailing boat with a deep fixed keel, the boat being indicated in phantom line in a fully loaded position for transport on the trailer;

FIG. 9 is a plan view of the trailer as shown in FIG. 8;

FIG. 10 is an end elevational view of the trailer shown in FIG. 8, with a fully loaded deep fixed keel sailing boat shown in phantom line;

FIG. 11 is an end elevational view similar to FIG. 10 with the hull supporting elements in an alternative arrangement supporting a lighter sailing boat wherein the side booms are positioned inboard of the upright hull supporting elements;

FIG. 12 is a fragmentary perspective view, to an enlarged scale, showing the pivotal connection between a side frame member and a roller assembly carrying cross member of the trailers shown in FIGS. 8 through 11;

FIG. 13 is a perspective view, with portions broken away, of a vertically extendable post which supports the hull engaging roller assembly in an elevated position as shown on the trailers in FIGS. 8 through 11;

FIG. 14 is a cross sectional view taken on the line 14—14 of FIG. 13 with parts removed to better illustrate the structural relationship of the telescoping members;

FIG. 15 is a partial elevational view, to an enlarged scale, taken on the line 15—15 of FIG. 9;

FIG. 16 is a partial sectional view, to an enlarged scale, taken on the line 16—16 of FIG. 15;

FIG. 17 is a partial sectional view, to an enlarged scale taken on the line 17—17 of FIG. 9;

FIG. 18 is a cross sectional view showing an arrangement for providing a keel support, with keel guide members, taken on the line 18—18 of FIG. 9;

FIG. 19 is a partial sectional view taken on the line 19—19 of FIG. 18;

FIG. 20 is an elevational view illustrating the loading of a deep keel sailing boat from the water directly onto a trailer with the area at the water's edge inclined so as to form a launching ramp;

FIG. 21 is a perspective view, to an enlarged scale, showing an alternative embodiment of a hull engaging support in the form of a bunk carried upon a support tube of a pivotal cross member;

DESCRIPTION OF THE PREFERRED EMBODIMENT OF THE INVENTION

Figure 22:
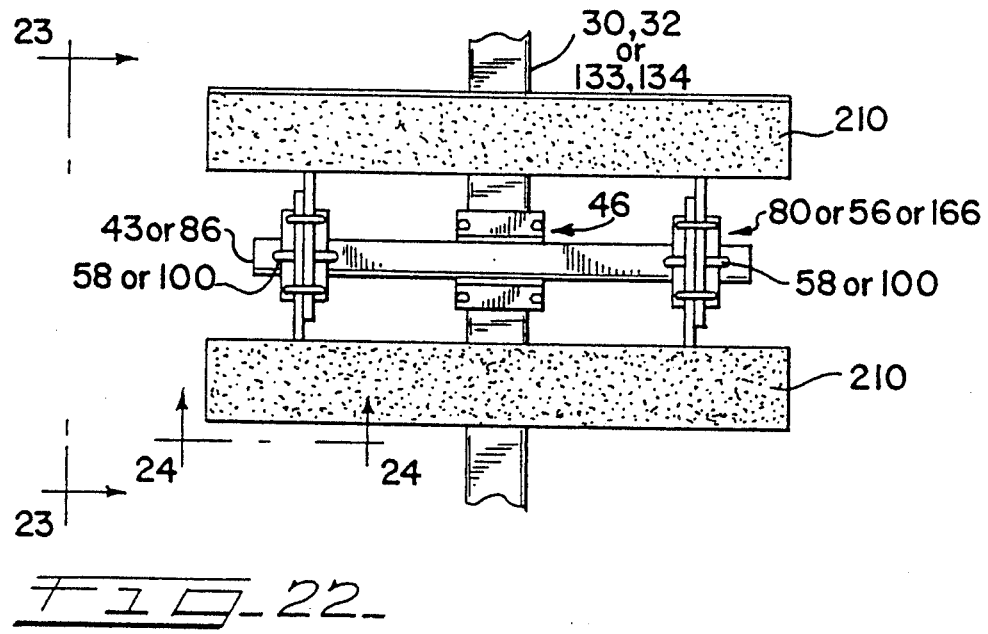
FIG. 22 is a plan view of a preferred alternative embodiment of a hull engaging support bunk arrangement.

Referring now to the drawings, various arrangements are illustrated for adapting a trailer for loading and hauling or supporting a low or shallow draft type boat in one arrangement and in another arrangement a deep draft or shoal draft type boat, such as, a sailboat with a fixed keel. Both arrangements are obtainable on a basic trailer frame module by properly positioning or adjusting certain of the supporting elements of the trailer. In this manner the trailer construction enables a boat to be loaded directly from the water by backing the trailer down a ramp or incline and bringing the rearmost hull engaging roller assemblies into position close to the boat. The boat is then advanced into contact with the roller assemblies and drawn forward into supporting engagement with the rearmost hull engaging roller assemblies. The trailer is readily adapted for fast and easy loading of either type of boat and is so designed that the basic trailer frame structure may form the basis for either type while providing for considerable variation in size and hull configuration.

In the trailer arrangement shown in FIGS. 1 through 7, the basic frame structure 10 comprises laterally spaced, elongated side frame members or booms 12 and 13 arranged with major portions in parallel relation and having bolted thereto an axle 14 and springs (not shown) which are longitudinally adjustable relative to the side boom or frame members. On the opposite ends of the axle 14 are wheels 15, 16, each of which is partially covered by an associated fender. While a single axle arrangement is shown, a double axle or tandem wheel arrangement may be used, either of which may be moved along the side booms 12 and 13 to obtain a desired tongue weight distribution as is known to those skilled in the art. The forward ends of the longitudinal side frame members 12, 13 have portions which converge toward each other and terminate on opposite sides with a tongue 17. The tongue 17 extends along a longitudinal center line of the trailer frame, with the trailing end secured by a U-bolt 18 to a short tongue-to-boom yoke 20 which has its opposite ends secured by U-bolts 22, 23 adjacent the ends of the side frame members 12 and 13. The forward end of the tongue 17 has mounted thereon a hitch coupler 24 for connection to a cooperating connecting element on a powered vehicle used for pulling the trailer. An upstanding, substantially inverted Y-shaped, winch stand 25 is carried on the tongue 17, which is adjustable fore, aft, and vertically, and supports at its upper end a manually or power operated winch 26. The winch 26 is mounted on a frame assembly 27 which extends in the direction of the rear or trailing end of the trailer. The frame assembly 27 also supports a bow engaging roller stop assembly 28 provided for steadying the bow end of the boat when in a fully loaded position during its transport. The winch 26 includes a cable 29 with means for attaching the free end to the bow of a boat for drawing the boat onto the roller assembly supports.

The trailer side frame members or booms 12, 13, are laterally spaced by cross bar members 30 and 32, which are pivotally supported therefrom. In the form illustrated, which is arranged for supporting a shallow draft power boat thereon, the cross bar member 30 is mounted near the trailing end of the trailer while cross bar member 32 is spaced forwardly thereof. The position and spacing of these members lengthwise of the trailer will depend upon the weight distribution of the boat to be carried. In trailers for power boats, the position of the engine is the main weight to be considered, while in a sailboat trailer the position of the keel is the main weight to be considered in determining where to locate the bars 30, 32 so as to best distribute the weight for transport.

The pivotal cross bar members 30 and 32, which laterally space the side booms 12 and 13 for forming a basic trailer structure, are pivotally mounted at their opposite ends on the side frame bars 12 and 13 in an identical manner so as to enable them to tilt or pivot within predetermined limits about axes extending transversely of the frame to facilitate loading a boat directly from or into the water. The pivot mounting in the form illustrated on the trailer of FIGS. 1 and 2 is shown in FIGS. 6 and 7 and comprises a connecting bracket member 35 of relatively short length and substantially C-shaped in cross section. The bracket is formed with a top plate-like portion 36 adapted to seat on the bottom surface of the side rail 12 or 13, and to be held in position by a U-bolt element 37 which encompasses the boom member. This mounting permits ready adjustment of the position of the cross bar members 30 and 32 along the length of the side rails.

The bracket 35 has a wall section or portion 38 depending from the edge of the top portion 36 and extending substantially vertically therefrom to a bottom section 40 of bi-planar curved cross section in which a pair of bolt holes 41 are provided to receive a U-bolt element 41a having its leg portions extending through the top and bottom walls of the cross member tube 30 or 32. The bolt holes 41 are sufficiently large in diameter, relative to the cross sectional diameter of the bolt member 41a, to permit tilting or turning of the cross member 30 or 32 within a predetermined range of swinging or pivoting movement about an axis extending transversely of the trailer frame.

The cross bar members 30 and 32 carry hull engaging roller assemblies which are arranged in paired relation with the assemblies of each pair thereof, in the form illustrated, being arranged on opposite sides of the longitudinal center line of the trailer. Since the details of the assemblies of each pair thereof are identical, the elements on one side of the center line of the assembly which correspond to elements on the other side will be identified by the same numerals primed. For the purpose of illustration, different types of roller assemblies which may be carried by the cross bar members 30 and 32 are shown. However, normally the same type of roller configuration will be employed through the trailer with the particular type of configuration depending upon the capacity of the trailer.

The rearmost cross bar member 30, in the form shown, carries hull engaging roller assemblies 42 and 42′ of identical construction which are shown spaced equally on opposite sides of the longitudinal center line of the trailer and mounted for pivotal movement about parallel axes extending longitudinally of the trailer frame (FIG. 3). These assemblies 42, 42′ comprise base support members 43, 43′ of relatively short length which are mounted in parallel, transversely spaced relation on the cross bar member 30 and carry at their fore and aft ends pivotally mounted hull engaging roller sub-assemblies 44, 45 and 44′, 45′.

As shown in FIGS. 2 to 5, the member 43, is in the form of a roller supporting longitudinally extending tube, which is mounted on the cross frame bar 30 by means of a pair of spaced angle brackets 46, each having one leg secured to the cross bar 30 by U-bolt 47, or other fastening means of similar character. The U-bolts 47 straddle the bar 30 and permit lateral movement along the longitudinal axis of the same. The bracket members 46 have confronting upstanding leg portions 48 (FIG. 3A) lying along opposite side faces of the longitudinally disposed bar member 43 and are secured thereto by bolts 50. The tube member 43 has a pair of holes 52, for the bolts 50, located in a transverse plane which is off center relative to the longitudinal axis of the tube member 43. The upstanding legs 48, of the bracket members 46, have vertically spaced pairs of bolt holes 53 and 54, for cooperation therewith, which enables the tube member 43 to be secured at four different elevations relative to the cross bar member 30. Two positions are effected by selective use of the upper or lower pairs of holes 53 or 54 in the bracket members 46, and two additional spacial positions may be effected by rotation of the tube 43 about its longitudinal axis. For additional adjustment the bracket 46 may be reversed to provide the lower position.

The tube member 43 has a roller assembly 45 mounted at its trailing end assembly 44 mounted at its forward ends both mounted to the tube in a similar manner. A rocker plate 55 is adjustably connected to the bottom face of a two-part cross bar assembly 56, by means of a pair of spaced U-bolts 57. The rocker plate 55 is mounted for rocking or pivotal movement on the tube member 43 by means of an inverted U-shaped bolt and carried on a guide 43a of plastic material forming a bearing surface. As best shown in FIG. 3, a stop 55a is formed on the side of each rocker plate 55 to limit the outboard pivotal movement of the roller assemblies away from each other to facilitate drawing a boat onto the trailer.

The cross bar assembly 56 comprises two bars in side by side relation and clamped together by U-bolts 57. The cross bar assembly 56 has mounted on each of the outwardly extending ends thereof pairs of clamp plates 60 and 62 which are secured by means of bolts 63 and 64 so as to be readily adjustable along the length of the two bars 56. At their uppermost ends the clamp plates 60 and 62 have relatively short length pivotable axle forming members 65, 66 mounted thereon by means of pivot bolts 67, 68. The axle members 65, 66 carry, at their opposite ends, hull engaging rollers 70 which are mounted for free rotatable thereon and which are pivotable about pivot bolts 67, 68 on an axis parallel to the pivot axis of the entire assembly 56 about the U-bolt 58. This arrangement, as heretofore described, provides adjustability of the position of the rollers 70 relative to the bar members 56 and facilitates continuous engagement of the boat hull at all contact points to evenly distribute the during launching, loading or transport through a multi-planar weight and/or compound pivotal action.

In the trailer as illustrated in FIGS. 1 through 7, the roller arrangement at the other end of the support tube 43 is of somewhat different construction. As pointed out previously, the roller assembly at either end of the support tube 43 will normally be identical for even distribution of weight per roller. The particular roller assembly employed, single, multiple, or quad, will depend on the weight capacity of the trailer. As shown in FIG. 4, the multiple roller assembly 44 has been found particularly suitable for use with power boats in order to accommodate strakes. The roller assembly 44 comprises pairs of hull engaging rollers 74 which are mounted for free rotation on axle forming ends of pivotally mounted generally shallow depth U-shaped bar members 73, 74. The bar members 73, 74 are secured for predetermined pivotal movement by means of small pivot brackets 75, 76 intermediate their ends to the outwardly extending ends of side by side disposed cross bar members 77, 78 which together form a two-part supporting bar 80 (similar to the manner of the two-part cross bar 56) which is pivotally mounted on tube members 43 by means of a rocker plate 82 and cooperating U-bolt 83. The bar members 77, 78 are secured to the rocker plate 82 by means of spaced U-bolts 84 which enables lateral adjusting movement of the bar members 77, 78 to vary the lateral spacing of the roller assemblies to properly position the rollers relative to the strakes with which most deep V hull power boats are equipped.

At the forward or leading end of the trailer shown in FIGS. 1 and 2, a cross bar member 32 (FIGS. 2 and 5) is swingably or pivotally mounted on the side boom or frame members 12 and 13 in the same manner as cross bar 30. The cross bar 32 has mounted thereon, in generally parallel relation, transversely spaced longitudinally extending roller support tubes 86, 86'. The tubes 86, 86' are of relatively short length, and are secured on the cross bar 32 in the same manner as the support tubes 43, 43', by cooperating bracket forming angle members 87 and U-bolts 88 (FIG. 5). Such bracket and U-bolt mounting enables adjusting the lateral position of these members along the cross bar 32 to best support the boat hull configuration which is to be carried thereon.

The support tubes 86, 86' carry, at their opposite ends, hull engaging roller assemblies 90, 92 and 90' and 92' of identical construction. As shown in FIG. 5 the roller assembly 92 comprises a of cross bars 93, 94 having hull engaging rollers 95 journaled, for free rotation, on their axle forming outer ends. The two cross bars 93, 94 are disposed in side by side relation (as bar members 77, 78) and secured to a rocker plate 96 by a pair of U-bolts 97 which permit adjustment in an axial direction so as to enable variation in the lateral spacing of the rollers 95, 95'. A groove 98, formed in the face of the rocker plate surface which is adjacent the cross bars 93 and 94, provides a bearing for a U-bolt member 100 which has its legs secured in suitable bores in the support tube 86 to permit predetermined pivotal movement about a longitudinally extending axis. This mounting in the manner previously described, facilitates the roller assembly 92 maintaining continuous engagement with the boat hull while the rollers freely rotate as the boat is loaded or unloaded. This single roller type assembly is best adapted for hauling smaller or lighter weight boats.

In the form of the trailers which are illustrated in FIGS. 8 through 19, the size or dimensions of the frame forming members have been increased to adapt the trailer for carrying a boat of substantially larger length and weight. Also, some features are shown in modified form which may be incorporated, if desired, in the trailer shown in FIGS. 1 through 7. Some additional elements are shown which are employed to convert the basic trailer module to handle deep draft type craft, such as, a deep keel sailboat with a fixed keel as indicated in phantom line in FIGS. 8, 10 and 11. In this form of the trailer, which is designed for hauling a boat of greater weight, it may be desirable to support the side frame members, as shown, on a tandem wheel arrangement.

Referring to FIGS. 8 and 9 the trailer frame 110 comprises elongate, parallel, laterally spaced side boom or frame members 112 and 113 from which are supported a pair of axles 114 and springs (not shown) longitudinally adjustable relative thereto, and the outer ends of which have journaled thereon a pair of wheels 115 and 116 with associated fenders. The side booms 112, 113 have forward end portions converging to form a tongue 117. The tongue member 117 has its trailing end secured by U-bolt 118 to a short tongue-to-boom yoke member 120, the opposite ends of which are secured by U-bolts 122, 123, or the like, adjacent the ends of the side frame members 112, 113. The forward end of the tongue member 117 has mounted thereon a hitch coupler 124. An inverted U-shaped winch stand 125 is mounted in upstanding relation on the tongue member 117, and carries near the top thereof a winch 126, mounted on a frame assembly 127, and a bow engaging roller stop assembly 128. The winch includes a cable 130 with means for attaching the free end to the bow of a boat. A trailer constructed in the manner hereinafter described in detail will load a sailboat, either deep keel or shoal draft, directly from the water as illustrated in FIG. 20. The trailer is backed into the water a sufficient distance for roller assemblies 167, at the trailing end of the trailer, to engage the bow of the boat. The cable or winch line 130 is attached to the boat and the latter pulled onto the rollers. The rollers and post will swing and pivot so as to conform to the hull surfaces at all times, and as the boat is drawn forward the posts 145 will pivot with cross members 133, 134 to lift the boat onto the trailer. In launching the boat, the loaded trailer is backed down the ramp and the boat is released to be lifted by the rear post supported hull-conforming rollers to place the boat directly into the water.

The parallel side rails or booms 112 and 113 (as best shown in FIG. 9), are laterally spaced by pivotally connected cross members 133 and 134 which will be longitudinally positioned along booms 112, 113 to best support the weight of the boat. The cross bar members 133 and 134 are identical and are pivotally mounted at opposite ends inwardly of and from beneath the side boom members 112 and 113 for maximum lateral adjustment. The mounting of each end of the cross bar members 133 and 134, is best illustrated in FIG. 12, where an end portion of the cross bars 133 and 134 has mounted, in spaced relation and on the topmost face, a pair of angle plates or brackets 139, 139' which have one leg 132, 132' secured on the cross bar 134 by bolts 135 and associated clamp plates 135' or other suitable securing means, with the upwardly extending other leg 136, 136' extending vertically along a side face of the frame side member 113. A pair of vertically spaced bolts 137, 137' extend transversely on the frame side member or boom 113 between an associated pair of clamp plates 138, 138' which lie along opposite side faces or the side frame bar 113. The lowermost bolt 137 extends through the spaced upstanding legs 136, 136' of the angle brackets 139, 139' and is located in spaced relation above the top face of the cross bar member 134 so as to permit a predetermined swinging o pivoting movement of the cross bar member 134 about an axis extending transversely of the trailer frame.

The cross members 133, 134 each have mounted thereon a pair of upright post forming members 145 (or may have brackets 46 depending on the boat hull type to be supported) which are vertically adjustable and adapted to carry the roller bearing structures at a predetermined elevation above the boom members 112, 113 to accommodate the depending fixed keel of a deep draft boat such as illustrated in FIGS. 8, 10 and 11. The posts 145, as best shown in FIG. 13, each comprise a bottom tube member 146 and a top tube member 147 which is of a smaller cross section and mounted in adjustable sliding or telescoping relation within the bottom tube 146. The bottom tube member 146 has opposite bottom edges welded or otherwise secured to a pair of flange forming mounting plates 148, 148' so that when mounted on a horizontal surface the member 146 will be inclined or tilted a small amount toward each other. The two mounting plates 148, 148' are provided with pairs of holes for receiving the legs of U-bolts 150, 150' to enable the same to be secured in position on a cross bar member 134. The uppermost tube member 147 has a cap plate 152 mounted thereon with pairs of spaced holes for receiving the legs of U-bolts 153, 153'.

The top post member 147 has a small plate 154 connected to the lower end thereof and a small tube 155 which extends upwardly from a bolt receiving hole in the plate 154 to form a height limiting stop. A height adjusting bolt 156 extends through a hole in a triangular mounting plate 157, which is carried at a top corner of the bottom post member 146, with its threaded end extending through the small stop tube 155 and plate member 154 for threaded engagement with a nut 158 secured against rotation at the bottom face of the plate 154. By rotating the bolt head 159 the height of the top tube member 147 may be adjusted within a range to accommodate different keel depths. The bottom plate member 154 is connected on the lower end of the top tube member 147 forming the post 145 so that two adjoining edges rest on the inside faces of adjoining walls of the bottom tube member 146 of the post and serve, with a top guide member 160, to hold the top post member 147 in a vertical path during movement. The top guide 160 comprises a small threaded angle bolt bent to approximately a right angle with both ends threaded and extending through holes in the top margins of adjoining walls of the bottom post member 146 so as to receive securing nuts as shown in FIG. 14.

As shown in FIGS. 10 and 13, a brace member 161 may be secured in inclined relation between the cross member 134 and the top of the bottom post member 146. A piece of flat stock 161 is secured to the rod 160 carried at the top of the member 146 while the bottom end may be secured on the cross member 134 by a conventional U-bolt arrangement indicated at 164, thereby forming a tensile member to prevent outward movement of the post assemblies 145 due to any wedging action of a boat hull supported thereon.

Each of the upright or post members 145 carries at its upper end a longitudinally extending support member 165 for the roller assemblies (FIGS. 8 and 13) which is in the form of a tube of the same character as tube 43 in FIG. 3. On opposite ends of the support member 165 is a two-piece cross bar assembly 166 (best shown in FIG. 9) similar to support bar assembly 56, and pivotally mounted for tilting in a longitudinal direction in the same manner as the mounting of support bar assembly 56 which shown in FIG. 3. At each of the opposite ends of the two-piece support bar assembly 166 are carried a four roller assembly 167 of identical construction and mounting. Four rollers 168, which are included in each of the roller assemblies 167, are mounted in paired, free rolling relation on the ends of axle forming members 170 which are of identical construction. The axles 170 are each pivotally mounted by a pivot pin 172 and a small pivot bracket 173 on a relatively short longitudinally extending small bar member 174 (FIGS. 9, 15 and 16) which is in turn pivotally mounted, intermediate its ends, by means of a pivot pin 176 carried in a pivot bracket 175 which is secured to one of the members of the two-piece cross bar assembly 166.

The bracket 175 may be the same construction as pivot brackets 173 but mounted in inverted relation. A portion of the pivot bracket 173 is bifurcated and forms a pair of spaced upstanding bearing forming ears 177, 177' which straddle the axle member 170 and receive the pivot pin 172. A pair of similar spaced ears 178, 178', depending in planes normal to the planes of the upstanding ears 177, 177', straddle the bar member 174 and are connected thereto by a pivot pin or bolt 180 so as to permit predetermined pivotal movement of the axles 170 relative to the bar 174 and limited pivotal movement of the bar 174 relative to the two-piece cross bar assembly 166.

While transporting or storing a deep draft boat having a fixed keel, it is desirable to provide a keel engaging member to steady and support most of the keel weight. In FIGS. 18 and 19 there is best shown a keel engaging pad 190 carried on a keel supporting member 192 which is supported by a hinge at one end to be lowered a relatively small distance by lowering the opposite end below the associated side boom. The hinge arrangement at the one end may be in the form of a vertically disposed bolt 193 connecting the keel support 192 with a horizontally disposed mounting plate 194 which is movable along the length of the side rail member 112. The bolt 193 extends through an oversize hole in the plate 194 and is sufficiently loose relative thereto to permit hinging of the keel support 192 by vertical movement of the opposite end.

At the opposite end of the keel support member 192 is a similar mounting plate 196, adjustably mounted on the bottom of the side rail 113 means of a U-bolt 197. This end of the keel support member 192 is mounted by a hanger arrangement comprising a vertically disposed adjusting bolt 198, having a threaded lower end portion 200 of reduced diameter, extending through a suitable hole 202 in an inwardly extended portion of the plate 196 and engaging a nut 203 secured from turning relative to the keel support 192. The upper portion of the adjusting member 198 is provided with a U-shaped pivotally mounted swing-type handle 204. Rotation of the adjusting member 198 will raise and lower the keel support cross member 192 the desired amount to move the keel support pad 190 into keel engaging position for transport or storage, or out of engagement for launching or loading. In order to facilitate the loading, the cross member 192 carries a pair of keel guide members 205 and 206 which are in the form of lengths of plastic covered curved pipe mounted to extend upwardly and outwardly in planes longitudinal and transverse of the trailer center line. The guide members 205 and 206 may be secured to member 192 by U-bolts 207 and 208 to permit ready adjustment on the member 192.

Figure 23:
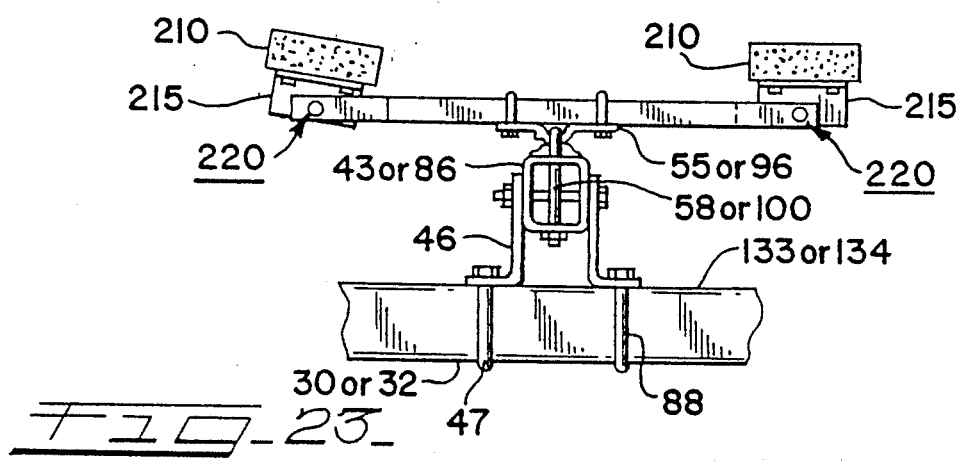
FIG. 23 is an end view of the support bunk structure shown in FIG. 22 taken along line 23—23.
Figure 24:
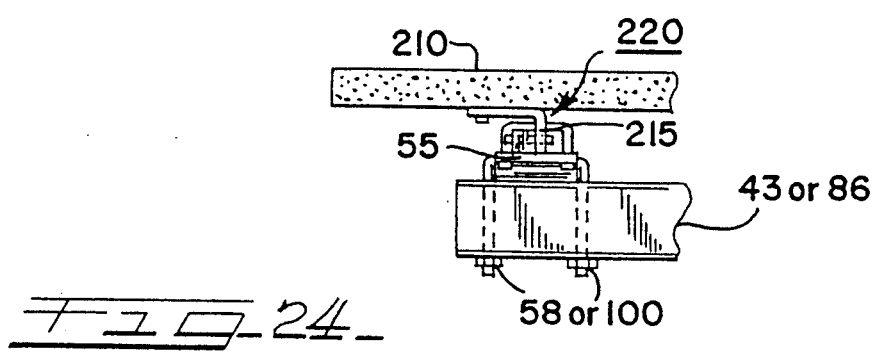
FIG. 24 is a partial side view of the support bunk structure shown in FIG. 22 taken along line 24—24.

The design of this trailer affords a basic bed or frame construction that does not require fixed structural cross members and may be varied in size. By replacing the structural cross frame members normally fixed to the side booms, with the longitudinally adjustable cross bar members which are pivotally supported from and laterally space the side booms, a basic trailer frame module is formed. Through use of various boat hull engaging support assemblies pivotally mounted to the pivotal cross bar members, the basic trailer frame module will accommodate various boat hull designs. While a preferred embodiment of this trailer utilizes roller assemblies for the best weight distribution of the boat on the hull supports, as shown in FIGS. 21-24, conventional hull supporting bunks 210 may be used to support the boat hull. Hull supporting bunks are preferred when adapting the trailer for a "drive on" loading configuration wherein rollers are used for the forward support (on cross member 32) and bunks, such as shown in FIGS. 22-24, are used on the rear support (cross member 34). In this manner a power boat can be driven part way onto the trailer when loading.

In FIG. 21 there is shown a conventional bunk 210, which may be a wooden two-by-four or two-by-six board covered with carpeting, secured to one of the rocker plates 55 or 96 as a replacement for the two-piece cross bar assemblies (56 or 80) which support a plurality of rollers. The bunk 210 extends in a direction transverse to the side frame members or booms 12 an 13 of the trailer. In this manner the bunk 210 can pivot about a first pivot axis with the pivotally mounted cross bar member 30, and about a second pivot axis which is transverse to the pivot axis of the cross bar members. Such a configuration wherein a pair of bunks 210 are carried on the cross member 30 as shown in FIG. 21 has been found satisfactory in constructing an inexpensive trailer for lightweight watercraft such as sailboats with removable center boards.

In FIGS. 22-24, there is shown a bunk 210, supported on brackets 215 which are pivotally connected to the ends of the two-piece cross bar assemblies 56 or 80. The bunks 210 extend parallel to the roller support tube 43 or 86 with opposing ends of the bunks 210 being connected to the outboard and inboard ends of the two-piece cross bar assemblies 56 or 80 pivotally supported at each end of both roller support tubes 43 or 86. In this embodiment, which is used for "drive on" trailer configurations, the bunks 210 may be adjusted laterally relative to one another on the two-piece cross bar assemblies 56 or 80 and pivot with the pivotally mounted cross bar member 30 about an axis transverse to the booms 12 and 13 in the manner previously described. In addition, the two bunks 210 are pivotally mounted on the roller support tubes 43 or 86 for pivotal movement about the U-shaped bolts 58 or 100 on an axis extending transverse to the cross bar bracket 30. The pivotal mounting of each end of the bunks 210 on bracket 215 allows the bunks 210 to be pivoted relative to each other about pivot axis 220. In this manner the hull engaging support surfaces on the bunks 210 are adapted for multiple and/or compound pivotal movement to facilitate driving a boat directly from the water onto the bunks 210.

While the invention has been described with reference to a preferred embodiment, it will be understood by those skilled in the art that various changes may be made and equivalents may be substituted for elements thereof without departing from the scope of the invention. In addition, many modifications made be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A sailboat trailer for launching and retrieving a sailboat having a keel extending outwardly from a sailboat hull including
    a frame comprising two elongated side frame members (112, 113) positioned in spaced relation relative to each other and carried on a spring-connected wheel-bearing axle (114) for movement upon a roadway surface,
    each one of said side frame members having a forward portion converging toward the other side frame member at a forward end to form a vehicle engaging tongue portion and a rear portion which extends parallel to the other side frame member to form a boat-supporting portion,
    said parallel boat-supporting portion of said side frame members being free from any cross frame members rigidly connected therebetween,
    a boat-supporting cross member (134) carried by and extending between said side frame members and adjacent the rear end of the trailer to laterally space said side frame members from one another,
    said boat-supporting cross member having opposite ends which are pivotally connected (137) to said boat-supporting portion of said side frame members for fore and aft pivotal movement of said boat-supporting cross member relative to said side frame members about an axis extending transversely of said boat-supporting portion of said side frame members to facilitate raising and lowering a sailboat having a keel extending outwardly from a sailboat hull on to and off of the trailer, and
    boat hull engaging support means (145) carried by said boat-supporting cross member (134) for pivotal movement therewith,
    said boat hull engaging support means (145) including an upwardly extending member extending upwardly from said boat-supporting cross member (134) a distance greater than the sailboat keel extends downwardly from the boat hull sufficient to support the sailboat hull when carried on the trailer.

2. The sailboat trailer of claim 1 wherein said boat hull engaging support means comprises
    at least two support bars (165) extending parallel to said rear boat-supporting portion of said side frame members (112, 113) and carried (145) by said boat-supporting cross member (134) for pivotal movement therewith,
    a plurality of boat hull engaging rollers (167) supported by each one of said support bars (165) for contacting a boat hull placed thereupon,
    adjusting means (166) carried by each of said support bars (165) and positioned between said support bar (165) and said boat hull engaging rollers (167) supported thereby for varying the lateral spacing between said boat hull engaging rollers to accommodate different size boat hulls,
    said adjusting means being pivotally supported (55) on said support bars and pivotally connected (67, 68) to said boat hull engaging rollers so that said boat hull engaging rollers will conform to the configuration of a boat hull placed thereupon, and
    at least two telescoping post-forming members (145) each secured at a lower end to said boat-supporting cross members (134) for pivotal movement therewith and extending upwardly therefrom above said side frame members with the upper end of said telescoping post-forming members secured (152, 153) to one of said support bars (165), and
    means for selectively adjusting the length of said telescoping post-forming member to vary the elevation of said boat hull engaging rollers above said side frame members for accommodating different size sailboat keels.

3. A sailboat trailer for launching and retrieving a sailboat having a keel extending outwardly from a sailboat hull including
    a frame comprising two elongated side frame members (112, 113) positioned in spaced relation relative to each other and carried on a spring-connected wheel-bearing axle (114) for movement upon a roadway surface,
    each one of said side frame members having a forward portion converging toward the other side frame member at a forward end to form a vehicle engaging tongue portion and a rear portion which extends parallel to the other side frame member to form a boat-supporting portion, a boat-supporting cross member (134) carried by and extending between said side frame members and adjacent the rear end of the trailer to laterally space said side frame members from one another, said boat-supporting cross member (134) having opposite ends which are pivotally connected (137) to said boat-supporting portion of said side frame members (112, 113) for fore and aft pivotal movement of said boat-supporting cross member relative to said side frame members about an axis extending transversely of said boat-supporting portion of said side frame members to facilitate raising and lowering a sailboat having a keel extending outwardly from a sailboat hull on to and off of the trailer, at least one additional boat-supporting cross member (133) extending between and pivotally (137) connected to said parallel boat-supporting portions of each of said side frame members (112, 113) for fore and aft pivotal movement relative thereto, said additional boat-supporting cross members (133) and said boat-supporting cross member (134) being positioned parallel to and on opposite sides of said spring-connected wheel bearing axle (114), and boat hull engaging support means carried by said additional boat-supporting cross member for pivotal movement therewith, said boat hull engaging support means carried by said boat supporting cross member (134) and said additional boat-supporting cross member (133) each comprising at least two support bars (165) extending parallel to said rear boat-supporting portion of said side frame members (112, 113) and carried (145) by said boat-supporting cross member (134) for pivotal movement therewith, a plurality of boat hull engaging rollers (167) supported by each of said support bars (165) for contacting a boat hull placed thereupon, adjusting means (166) carried by each of said support bars (165) and positioned between said support bar (115) and said boat hull engaging rollers (167) supported thereby for varying the lateral spacing between said boat hull engaging rollers to accommodate different size boat hulls, said adjusting means being pivotally supported (55) on said support bars and pivotally connected (67, 68) to said boat hull engaging rollers so that said boat hull engaging rollers will conform to the configuration of a boat hull placed thereupon, and at least two telescoping post-forming members (145) each secured at a lower end to each of said boat-supporting cross member (134) and said additional boat-supporting cross members (133) for pivotal movement therewith and extending upwardly therefrom above said side frame members with the upper end of said telescoping post-forming members secured (152, 153) to one of said support bars (165), and means for selectively adjusting the length of said telescoping post-forming member to vary the elevation of said boat hull engaging rollers above said side frame members for accommodating different size sailboat keels.

4. The sailboat trailer of claim 3 further including keel support means (190) for supporting the keel of a sailboat carried by the boat trailer.

5. The sailboat trailer of claim 3 wherein the parallel boat-supporting portion of said side frame members between said pivotally connected boat-supporting cross member (134) and said additional pivotally connected boat-supporting cross member (133) is free from any cross frame member rigidly interconnecting one of said parallel boat-supporting portions of said side frame members with the other.

6. The sailboat trailer of claim 3 wherein the parallel boat-supporting portion of said side frame members is free from any cross frame member rigidly connected between said side frame members.

* * * * *